(12) United States Patent
Seo et al.

(10) Patent No.: US 11,087,495 B2
(45) Date of Patent: Aug. 10, 2021

(54) METHOD FOR CALIBRATION

(71) Applicant: TmaxData Co., Ltd., Gyeonggi-do (KR)

(72) Inventors: Jaemin Seo, Gyeonggi-do (KR);
Seokmin Kim, Gyeonggi-do (KR);
Seungkeol Kim, Gyeonggi-do (KR)

(73) Assignee: TmaxData Co., Ltd., Gyeonggi-do (KR)

( * ) Notice: Subject to any disclaimer, the term of this patent is extended or adjusted under 35 U.S.C. 154(b) by 1 day.

(21) Appl. No.: 16/601,398

(22) Filed: Oct. 14, 2019

(65) Prior Publication Data

US 2020/0410716 A1    Dec. 31, 2020

(30) Foreign Application Priority Data

Jun. 26, 2019    (KR) .................. 10-2019-0076563

(51) Int. Cl.
*G06T 7/00* (2017.01)
*G06T 7/80* (2017.01)
(Continued)

(52) U.S. Cl.
CPC ............ *G06T 7/80* (2017.01); *G06K 9/00523*
(2013.01); *G06K 9/3208* (2013.01); *G06T 7/70*
(2017.01);
(Continued)

(58) Field of Classification Search
CPC ............ G06K 9/00087; G06K 9/0002; G06K 9/0004; B60R 25/252; B60R 25/014;
(Continued)

(56) References Cited

U.S. PATENT DOCUMENTS 9,805,505 B2 * 10/2017 Datta ................... G06T 7/62
2016/0246396 A1 * 8/2016 Dickinson ........... G06K 9/00107
(Continued)

FOREIGN PATENT DOCUMENTS

KR    1020140114594 A    9/2014
KR    1020190030242 A    3/2019

OTHER PUBLICATIONS

Dubska ("Automatic Camera Calibration for Traffic Understanding", TACR project V3C, TE01020415, 2014) (Year: 2014).*
(Continued)

*Primary Examiner* — Ping Y Hsieh
(74) *Attorney, Agent, or Firm* — Umberg Zipser LLP; Ryan Dean

(57) ABSTRACT

According to an exemplary embodiment of the present disclosure, a computer program stored in a computer readable storage medium is disclosed. The computer program causes one or more processors to perform operations below for performing calibration when the one or more processors are executed, and the operations may include: an operation of inputting an image to an object detection model and performing object detection by using the object detection model; an operation of acquiring bounding box information on the detected object; and an operation of performing calibration on an image acquisition device based on at least a part of the bounding box information.

16 Claims, 6 Drawing Sheets

(51) Int. Cl.
  *G06K 9/00* (2006.01)
  *G06K 9/32* (2006.01)
  *G06T 7/70* (2017.01)
(52) U.S. Cl.
  CPC .................. *G06K 2209/23* (2013.01); *G06T 2207/30244* (2013.01); *G06T 2207/30252* (2013.01)
(58) Field of Classification Search
  CPC ..... B60R 25/012; B60R 25/06; B60R 25/305; G02B 9/34; G02B 13/004; G02B 13/0045; G02B 13/0035; G02B 9/62; G02B 9/60; G02B 9/12; G02B 9/64; G02B 13/06
  See application file for complete search history.

(56) References Cited

U.S. PATENT DOCUMENTS

2018/0184078 A1* 6/2018 Shivalingappa ..... G06K 9/3216
2019/0258257 A1* 8/2019 Zhang .................. G05D 1/0094
2020/0380305 A1* 12/2020 Sharma .............. G06K 9/00791

OTHER PUBLICATIONS

Arsalan Mousavian, et al. "3D Bounding Box Estimation Using Deep Learning and Geometry", Dec. 1, 2016, pp. 7075-7082.
Bhardwaj et al., "AutoCalib: Automatic Traffic Camera Calibration at Scale," ACM Transactions on Sensor Networks, Nov. 2018; 14(3-4), Article 19; 27 pgs.
Office Action for Korean Patent Application No. 10-2019-0076563 dated Dec. 10, 2020; 4 pgs.

\* cited by examiner

FIG. 3

```
                          ┌─── 310
                    CONVOLUTIONAL LAYER
            │            │            │            │
          ┌─330        ┌─350        ┌─370        ┌─390
       FIRST FULLY  SECOND FULLY  THIRD FULLY  FOURTH FULLY
    CONNECTED LAYER CONNECTED LAYER CONNECTED LAYER CONNECTED LAYER
            │            │            │            │
          ┌─331        ┌─351        ┌─371        ┌─391
      AZIMUTH RANGE  NORMALIZATION ELEVATION RANGE NORMALIZATION
                         │                           │
                       ┌─352                       ┌─392
                      AZIMUTH                    ELEVATION
```

FIG. 4

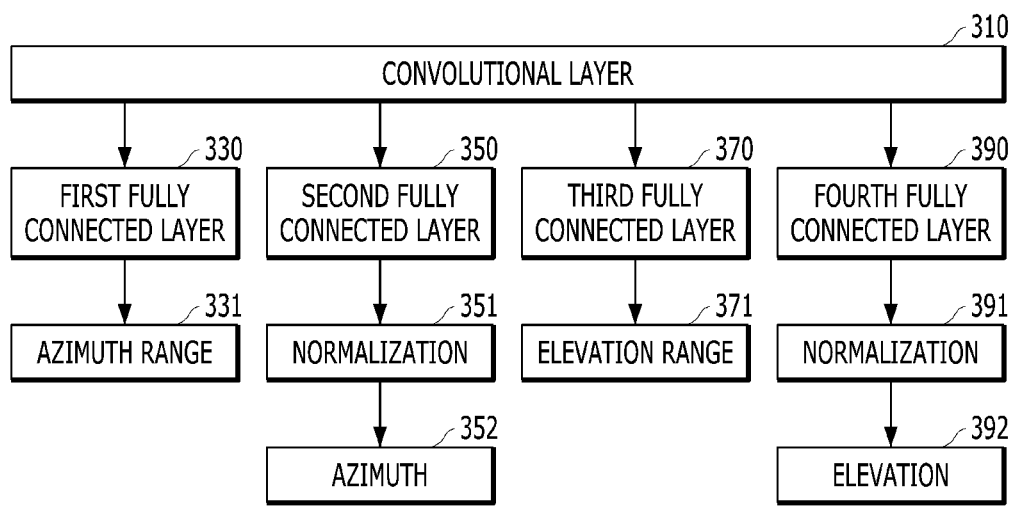

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} x \\ y \\ z \\ 1 \end{bmatrix}$$

SCALE(420) — s; COORDINATE SYSTEM OF IMAGE(410); FIRST MATRIX(430); SECOND MATRIX(450); COORDINATE SYSTEM OF IMAGE ACQUISITION DEVICE(490); (480)

METHOD FOR CALIBRATION

CROSS-REFERENCE TO RELATED APPLICATIONS

This application claims priority to and the benefit of Korean Patent Application No. 10-2019-0076563 filed in the Korean Intellectual Property Office on Jun. 26, 2019, the entire contents of which are incorporated herein by reference.

TECHNICAL FIELD

The present disclosure relates to data processing by using a computing device, and more particularly, to a method for calibration.

BACKGROUND ART

A camera is a device used for generating an image or a video. Data acquired by a camera is used for a variety of different purposes and contexts. For example, there is a device which recognizes an object by using data acquired by a camera. Recently, in order to improve accuracy of data acquired by a camera, calibration may be performed.

The calibration may be performed in order to secure precision and accuracy of a camera. The calibration may determine parameters of a camera generating an image to improve precision and accuracy of the camera.

Further, the calibration may decrease an error generated according to a disposed location of a camera to secure precision and accuracy of the camera. In actuality, it cannot be guaranteed that the data acquired by a camera perfectly matches the real world due to an error generated according to a disposed location of the camera. Accordingly, in order to decrease the error, interest in the calibration is growing.

Korean Patent Application Laid-Open No. 10-2017-0116914 discloses a calibration device and method for a vehicle.

SUMMARY OF THE INVENTION

The present disclosure is conceived in response to the background art, and has been made in an effort to provide a calibration method.

According to an exemplary embodiment of the present disclosure for implementing the foregoing object, a computer program including commands which are stored in a computer readable storage medium and cause a computer to perform operations below is disclosed. The operations may include: an operation of inputting an image to an object detection model and performing object detection by using the object detection model; an operation of acquiring bounding box information on the detected object; and an operation of performing calibration on an image acquisition device based on at least a part of the bounding box information.

In an alternative exemplary embodiment, the object may include a vehicle object.

In the alternative exemplary embodiment, the bounding box information may include 3D bounding box information acquired based on the image.

In the alternative exemplary embodiment, the 3D bounding box information may include at least one of information on a coordinate system of the object set based on detailed component information on the object and rotation angle information on a coordinate system of an image acquisition device which acquires an image based on the information on the coordinate system of the object.

In the alternative exemplary embodiment, the rotation angle information may include at least one of an azimuth of the coordinate system of the image acquisition device and an elevation of the coordinate system of the image acquisition device.

In the alternative exemplary embodiment, the object detection model may include: a convolutional layer which extracts a feature of the image; a first fully connected layer which receives the extracted feature and acquires an azimuth range of the coordinate system of the image acquisition device; and a second fully connected layer which acquires an azimuth of the coordinate system of the image acquisition device within the azimuth range.

In the alternative exemplary embodiment, the object detection model may include: the convolutional layer which extracts a feature of the image; a third fully connected layer which inputs the extracted feature and acquires an elevation range of the coordinate system of the image acquisition device; and a fourth fully connected layer which acquires an elevation of the coordinate system of the image acquisition device within the elevation range.

In the alternative exemplary embodiment, the operation of performing the calibration on the image acquisition device based on at least a part of the bounding box information may include: an operation of calculating a distance between the image acquisition device and a reference point based on bounding box information on each of at least one object; an operation of selecting a reference object serving as a reference for performing the calibration based on a predetermined reference; and an operation of performing the calibration based on the reference object.

In the alternative exemplary embodiment, the operation of calculating the distance between the image acquisition device and the reference point based on bounding box information on each of at least one object may include an operation of calculating a scale that is a ratio of a size of the object in the coordinate system of the image and a size of the object in the coordinate system of the image acquisition device.

In the alternative exemplary embodiment, the operation of converting the coordinate system of the image to the coordinate system of the image acquisition device may include an operation of converting the coordinate system of the image to the coordinate system of the image acquisition device by using a first matrix including the information on the image acquisition device and a second matrix including the rotation angle information.

In the alternative exemplary embodiment, the operation of converting the coordinate system of the image to the coordinate system of the image acquisition device by using the first matrix including the information on the image acquisition device and the second matrix including rotation angle information may include: an operation of calculating an intermediate result value by calculating the coordinate system of the image and an inverse matrix of the first matrix; and an operation of converting the coordinate system of the image to the coordinate system of the image acquisition device by calculating the calculated intermediate result value and an inverse matrix of the second matrix.

In the alternative exemplary embodiment, the predetermined reference may include at least one of a reference determined based on a statistic of the distance between the image acquisition device and the reference point calculated based on the bounding box information on each of at least one object or a reference determined based on a difference between an actual distance between the image acquisition device and the reference point and a calculated distance between the image acquisition device and the reference point.

In the alternative exemplary embodiment, the operation of performing the calibration on the image acquisition device based on at least part of the bounding box information may include: an operation of calculating center coordinates of the object based on the bounding box information on each of at least one object; an operation of determining a reference plane serving as a reference for performing the calibration based on the center coordinates of at least one object; and an operation of performing the calibration based on the reference plane.

In the alternative exemplary embodiment, the center coordinates of the object may include at least one of a first coordinate component calculated based on the coordinates and the scale of the object in the coordinate system of the image and a second coordinate component including a distance between the image acquisition device and a plane including the center coordinates of the object.

In the alternative exemplary embodiment, the operation of determining the reference plane serving as the reference for performing the calibration based on the center coordinates of at least one object may include: an operation of calculating a third matrix including the first coordinate component in the center coordinates of at least one object; an operation of calculating a fourth matrix including the second coordinate component in the center coordinates of at least one object; and an operation of determining the reference plane based on the third matrix and the fourth matrix.

According to another exemplary embodiment of the present disclosure, a method for performing calibration is disclosed. The method may include: an operation of inputting an image to an object detection model and performing object detection by using the object detection model; an operation of acquiring bounding box information on the detected object; and an operation of performing calibration on an image acquisition device based on at least a part of the bounding box information.

According to another exemplary embodiment of the present disclosure, a computing device is disclosed. The computing device includes: one or more processors; and a memory storing commands executable in the processor, and the one or more processors may input an image to an object detection model and perform object detection by using the object detection model, acquire bounding box information on the detected object, and perform calibration on an image acquisition device based on at least a part of the bounding box information.

The present disclosure may provide the method for calibration.

BRIEF DESCRIPTION OF THE DRAWINGS

Some of the exemplary embodiments are illustrated in the accompanying drawings so that the foregoing characteristics of the contents of the present disclosure can be understood in detail with more specific explanations with reference to the following exemplary embodiments. Further, like reference numerals in the drawings are intended to refer to the same or similar functions throughout the several aspects. However, the accompanying drawings merely illustrate specific and typical exemplary embodiments of the contents of the present disclosure and are not considered to limit the range of the present invention, and it is noted that other exemplary embodiments having the same effect can be fully appreciated.

FIG. 3 is a block diagram for describing an operation of acquiring rotation angle information for performing calibration according to the exemplary embodiment of the present disclosure.

FIG. 4 is an example diagram for describing an operation of converting an image coordinate system to a coordinate system of an image acquisition device according to the exemplary embodiment of the present disclosure.

DETAILED DESCRIPTION

Figure 1:
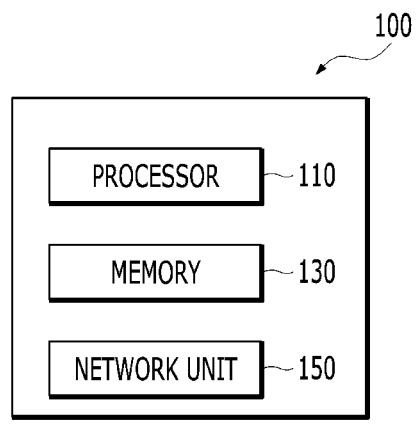
FIG. 1 is a block diagram illustrating a computing device for performing calibration according to an exemplary embodiment of the present disclosure.

Hereinafter, various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification refer to a computer-related entity, hardware, firmware, software, a combination of software and hardware, or the execution of software. For example, a component may be a procedure executed in a processor, a processor, an object, an execution thread, a program, and/or a computer, but is not limited thereto. For example, both an application executed in a computing device and the computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as Internet, through data and/or a signal from one component interacting with another component in a local system and a distributed system) having one or more data packets.

Further, a term "or" intends to mean comprehensive "or" not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

Further, a term "include" and/or "including" shall be understood as meaning that a corresponding characteristic and/or a constituent element exists. However, the term "include" and/or "including" shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

Further, the term "at least one of A and B" shall be interpreted as "the case where including only A", "the case where including only B", and "the case where including A and B".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description about the presented exemplary embodiments is provided so as for those skilled in the art to use or carry out the present invention. Various modifications of the exemplary embodiments will be apparent to those skilled in the art. General principles defined herein may be applied to other exemplary embodiments without departing from the scope of the present disclosure. Accordingly, the present invention is not limited to the exemplary embodiments presented herein. The present invention shall be interpreted within the broadest meaning range consistent to the principles and new characteristics presented herein.

FIG. 1 is a block diagram illustrating a computing device for performing calibration according to an exemplary embodiment of the present disclosure. A configuration of the computing device 100 illustrated in FIG. 1 is merely an example for simplicity. In the exemplary embodiment of the present disclosure, the computing device 100 may include other configurations for performing a computing environment of the computing device 100, and only a part of the disclosed configurations may also configure the computing device 100.

The computing device 100 may include a processor 110, a memory 130, and a network unit 150.

The processor 110 may be formed of one or more cores, and may include a processor for analyzing data and deep learning, such as a central processing unit (CPU), a general purpose graphics processing unit (GPGPU), and a tensor processing unit (TPU) of the computing device. The processor 110 may read a computer program stored in the memory 130 and process data for machine learning according to the exemplary embodiment of the present disclosure. According to the exemplary embodiment of the present disclosure, the processor 110 may perform a calculation for learning of a neural network. The processor 110 may perform a calculation, such as processing of input data for learning in deep learning (DL), extraction of a feature from input data, an error calculation, update of a weighted value of the neural network by using backpropagation, for learning of the neural network. At least one of the CPU, GPGPU, and the TPU of the processor 110 may process learning of a network function. For example, the CPU and the GPGPU may process learning of a network function and data classification by using the network function together. Further, in the exemplary embodiment of the present disclosure, the learning of the network function and the data classification by using the network function may be processed by using the processors of the plurality of computing devices together. Further, the computer program executed in the computing device according to the exemplary embodiment of the present disclosure may be a CPU, GPGPU, or TPU executable program.

The processor 110 may perform operations for performing calibration on an acquired image. The processor 110 may input an image to an object detection model, and detect an object by using the object detection model. The image may include data acquired by using an image acquisition device. The object may include an object existing within the image. Further, the object may include an object discriminated from a background within the image. For example, the object may include objects, such as a person, an animal, an object, a plant, a building, a transportation means, and an airplane, discriminated from a background. In the exemplary embodiment of the present disclosure, the object detection may include a 3D object detection which recognizes a 3D shape of an object in the image. The foregoing image and/or object is merely an example, and the present disclosure is not limited thereto.

According to the exemplary embodiment of the present disclosure, the object may include a vehicle object. The vehicle object may include an object for moving a person from one point to another point. The vehicle object may include an object including wheels of a circle shape. Further, the vehicle object may include an object for moving a person from one point to another point by using power. The vehicle object may include, for example, a car, a bus, a truck, an armored vehicle, a tank, a ship, and an airplane. The foregoing vehicle object is merely an example, and the present disclosure is not limited thereto.

According to the exemplary embodiment of the present disclosure, the object detection model may include a neural network for detecting an object in an image. The neural network may include a convolutional layer and/or a fully connected layer. The convolutional layer may include a neural network for extracting a feature from an image. The fully connected layer may include a neural network for classifying objects. The foregoing neural network is merely an example, and the present disclosure is not limited thereto.

According to another exemplary embodiment of the present disclosure, the object detection model may include a supervised learning model. The supervised learning neural network may be a neural network learned by using training data in which a correct answer is labelled to each training data. The supervised learning model may include at least one of a model which recognizes and classifies an object within an image, a model which recognizes and classifies an object within an image and performs localization for outputting location information on the object, and a segmentation model which classifies pixels, discriminates a boundary line of an object within an image from a background, and recognizes the object. The foregoing supervised learning model is merely an example, and the present disclosure is not limited thereto.

According to another exemplary embodiment of the present disclosure, the object detection model may include a supervised learning model trained by using a training data set. The training data set may be a set of data for training a model. The training data set may include images. The image may include a vehicle object. For example, the processor 110 may train the object detection model by using the training data set in which a vehicle object existing within an image is labelled. The processor 110 trains the object detection model by using the training data set in which the vehicle object is labelled, so that the object detection model may recognize the vehicle object existing within the image with high accuracy and precision. The foregoing training data set is merely an example, and the present disclosure is not limited thereto.

According to the exemplary embodiment of the present disclosure, the processor 110 may acquire bounding box information about the detected object. The detected object may include a vehicle object existing within the image. The bounding box information may be generated based on location information about the object existing within the image. The bounding box information may include data acquired by recognizing the object existing within the image in the form of a box. The box may include, for example, a quadrangular form in which the object existing within the image is included in a box. The box may also include, for example, a 2D box or a 3D box. The box may include, for example, a 3D box having a polyhedral structure (for example, a hexahedron and an octahedron). The foregoing matter is merely an example, and the present disclosure is not limited thereto.

According to the exemplary embodiment of the present disclosure, the bounding box information may include 3D bounding box information acquired based on the image. The processor 110 may perform the object detection on the object existing within the image. The processor 110 may acquire 2D bounding box information about the object existing within the image by using the object detection model. The 2D bounding box information may include box information including the object in a coordinate system expressed by using two axes. The 2D bounding box information may include width and length information on the box including the object. A size of the 2D bounding box may include, for example, a minimum size in which the object is includable in the box. The foregoing bounding box information is merely an example, and the present disclosure is not limited thereto.

According to the exemplary embodiment of the present disclosure, the processor 110 may acquire 3D bounding box information based on the 2D bounding box information. The 3D bounding box information may include box information including the object in a coordinate system expressed by using three axes. The 3D bounding box information may be the information generated by recognizing space information in a 3D space occupied by the object within the image. The 3D bounding box information may include width, length, and height information on the box including the object. For example, when the object is a car, the processor 110 may compute a width, a length, and a height of a box including the car. Further, when the object is a car, the processor 110 may compute a width, a length, and a height of a box including the car based on width, length, and height information on the car stored in the memory 130. Accordingly, the processor 110 may acquire the 3D bounding box information on the object existing within the image. The foregoing bounding box information is merely an example, and the present disclosure is not limited thereto.

According to the exemplary embodiment of the present disclosure, the processor 110 computes 3D bounding box information on the object existing within the image and performs calibration based on the computed 3D bounding box information, so that the calibration having high accuracy and precision may be performed. Cars have various appearances, so that a height, a width, a length, a rearview mirror size, a headlight shape, and an overall shape of a car may vary for each car. However, even though the cars having various appearances are object detection targets, the 3D bounding boxes may be acquired through the cars and it is not necessary to divide the cars, so that it is possible to solve a problem in that training data is short compared to the case where each of the cars is recognized. Accordingly, the calibration method of the exemplary embodiment of the present disclosure utilizes the 3D bounding box in order to acquire a correction coordinate system for calibration, so that a lightweight neural network structure and minimum training data may be required for recognizing a car.

When the calibration is performed by using the 3D bounding box according to the exemplary embodiment of the present disclosure, it is possible to perform the calibration despite the difference in the details of the various appearance of the car. Accordingly, it is possible to perform the calibration with high accuracy without being affected according to the difference in details of the car appearance.

According to the exemplary embodiment of the present disclosure, the 3D bounding box information may include at least one of a coordinate system information on the object set based on detailed component information on the object and rotation angle information on the coordinate system of the image acquisition device which acquires an image based on the coordinate system information on the object. The foregoing matter is merely an example, and the present disclosure is not limited thereto.

According to the exemplary embodiment of the present disclosure, the detailed component information on the object may include information for estimating a 3D disposition of the object. For example, the detailed component information on the object may include a headlight, an A pillar, a wheel, and the like of the vehicle, but the present disclosure is not limited thereto. The processor 110 may compute a 3D bounding box for the object based on the detailed component information on the object. Further, for example, the processor 110 may estimate a disposition (for example, front and back separation of the object, or whether the object is placed horizontally, vertically, or at an angle in the image) of the object in a 3D space in the disposition of the detailed component information on the object, and compute a 3D bounding box based on the estimated disposition. Further, for example, the processor 110 may recognize a detailed classification (for example, a car model and a model name) of the object based on the detailed component information on the object, so that it is possible to compute a 3D bounding box based on the recognized detailed classification of the object. The foregoing detailed component is merely an example, and the present disclosure is not limited thereto.

The processor 110 may acquire coordinate system information on the object based on the three axes based on the 3D bounding box including the object. For example, the processor 110 may determine a movement direction (for example, a horizontal axis of the object) of the object as one axis in the coordinate system of the object. A reference point of the 3D bounding box including the object may include, for example, a vertex of one corner and a surface of the 3D bounding box, a predetermined point of an inner space of the bounding box, and the like. The foregoing coordinate system information on the object is merely an example, and the present disclosure is not limited thereto.

According to the exemplary embodiment of the present disclosure, the rotation angle information on the coordinate system of the image acquisition device may include information on an angle difference between the coordinate system of the image acquisition device and the coordinate system of the object. The coordinate system of the image acquisition device may include the coordinate system determined based on an optical characteristic (for example, a focal length characteristic, a characteristic related to the disposition of the image acquisition device, and a view angle characteristic) of the image acquisition device. For example, the rotation angle information on the coordinate system of the image acquisition device may be 20° in an azimuth and 10° in an elevation based on the object coordinate system. The foregoing rotation angle information is merely an example, and the present disclosure is not limited thereto.

According to the exemplary embodiment of the present disclosure, the rotation angle information may include at least one of an azimuth of the coordinate system of the image acquisition device and an elevation of the coordinate system of the image acquisition device. The azimuth may include an angle difference between the object coordinate system and the coordinate system of the image acquisition device on the same 2D plane. The elevation may include an angle difference between the object coordinate system and the coordinate system of the image acquisition device on a plane that is vertical to a plane on which the azimuth is computed. For example, when the rotation angle information on the coordinate system of the image acquisition device is 20° in an azimuth and 10° in an elevation based on the object coordinate system, the processor 110 may compute the azimuth as 20° and the elevation as 10° as the rotation angle information on the coordinate system of the image acquisition device based on the angle difference between the coordinate system of the object.

In the real world, the image acquisition device and the object may exist on different 3D planes, not the same 2D plane. For example, in the case of a vehicle speed detection camera, the camera is located at a place higher than that of the vehicle. Accordingly, it is possible to expect the calibration having higher accuracy by including the elevation, as well as the azimuth, in the rotation angle information on the coordinate system of the image acquisition device. The foregoing rotation angle information is merely an example, and the present disclosure is not limited thereto.

Hereinafter, an operation of acquiring the rotation angle information for performing the calibration will be described with reference to FIG. 3.

According to the exemplary embodiment of the present disclosure, the object detection model may include a convolutional layer 310 which extracts a feature of an image, a first fully connected layer 330 which receives the extracted feature and acquires an azimuth range 331 of the coordinate system of the image acquisition device, and a second fully connected layer 350 which acquires an azimuth 352 of the coordinate system of the image acquisition device within the azimuth range 331. The foregoing object detection model is merely an example, and the present disclosure is not limited thereto.

According to the exemplary embodiment of the present disclosure, the processor 110 may input an image acquired from the image acquisition device to the convolutional layer 310 and acquire a feature of the image. The processor 110 may input the extracted feature to the first fully connected layer 330 and acquire the azimuth range 331. The first fully connected layer 330 may include a neural network for classifying the azimuth range 331. The azimuth range 331 may include a range in which the azimuth of the coordinate system of the image acquisition device based on the object coordinate system is included. For example, when the azimuth range 331 is divided into 12 sections based on 360°, one section may be 30°. In this situation, the processor 110 may input the feature acquired by inputting the image to the convolutional layer 310 to the first fully connected layer 330 to acquire the azimuth range 331 equal to or larger than 30° and less than 60°. That is, the processor 110 may acquire information in which the azimuth range of the coordinate system of the image acquisition device based on the object coordinate system is 30° or larger and less than 60°. The foregoing first fully connected layer 330 is merely an example, and the present disclosure is not limited thereto.

According to the exemplary embodiment of the present disclosure, the processor 110 may input an image acquired from the image acquisition device to the convolutional layer 310 and acquire a feature of the image. The processor 110 may input the extracted feature to the second fully connected layer 350 and acquire an azimuth of the coordinate system of the image acquisition device within the azimuth range acquired in the first fully connected layer 330. The second fully connected layer 350 may include a neural network for acquiring the azimuth 352 of the coordinate system of the image acquisition device within the azimuth range. The processor 110 may compute an offset value based on a median value of the azimuth range 331. Accordingly, the processor 110 may calculate an offset value computed based on the median value of the azimuth range 331 by using the second fully connected layer 350 to acquire the azimuth 352 of the coordinate system of the image acquisition device. For example, when the azimuth range is 30° or larger and less than 60°, a median value of the azimuth range is 45°, and when the offset value acquired through the second fully connected layer 350 is +10, the processor 110 may acquire an output indicating that the azimuth is 55°. The foregoing second fully connected layer 350 is merely an example, and the present disclosure is not limited thereto.

A description for the particular contents related to the method of acquiring the 3D bounding box is concretely discussed in the thesis "3D Bounding Box Estimation Using Deep Learning and Geometry (publication date: Dec. 1, 2016, Writers: Arsalan Mousavian, Dragomir Anguelov, John Flynn, and Jana Kosecka) of which the entirety is combined as a reference in the present application.

According to the exemplary embodiment of the present disclosure, the object detection model may include the convolutional layer 310 which extracts a feature of an image, a third fully connected layer 370 which inputs the extracted feature and acquires an elevation range 371 of the coordinate system of the image acquisition device, and a fourth fully connected layer 390 which acquires an elevation 392 of the coordinate system of the image acquisition device within the elevation range 371. The foregoing matter is merely an example, and the present disclosure is not limited thereto.

According to the exemplary embodiment of the present disclosure, the processor 110 may input an image acquired from the image acquisition device to the convolutional layer 310 and acquire a feature of the image. The processor 110 may input the extracted feature to the third fully connected layer 370 and acquire the elevation range 371. The third fully connected layer 370 may include a neural network for classifying the elevation range 371. The elevation range 371 may include a range in which the elevation of the coordinate system of the image acquisition device based on the object coordinate system is included. For example, when the elevation range 371 is divided into 18 sections based on 360°, one section may be 20°. In this situation, the processor 110 may input the feature acquired by inputting the image to the convolutional layer 310 to the third fully connected layer 370 to acquire the elevation range 371 equal to or larger than 40° and less than 60°. That is, the processor 110 may acquire information in which the elevation of the coordinate system of the image acquisition device based on the object coordinate system is 40° or larger and less than 60°. The foregoing third fully connected layer 370 is merely an example, and the present disclosure is not limited thereto.

According to the exemplary embodiment of the present disclosure, the processor 110 may input an image acquired from the image acquisition device to the convolutional layer 310 and acquire a feature of the image. The processor 110 may input the extracted feature to the fourth fully connected layer 390 and acquire an elevation 392 of the coordinate system of the image acquisition device within the elevation range 371 acquired in the third fully connected layer 370. The fourth fully connected layer 390 may include a neural network for acquiring the elevation of the coordinate system of the image acquisition device within the elevation range. The processor 110 may compute an offset value based on a median value of the elevation range 371. Accordingly, the processor 110 may calculate an offset value computed based on the median value of the elevation range 371 by using the fourth fully connected layer 390 to acquire the elevation 392 of the coordinate system of the image acquisition device. For example, when the elevation range 371 is 40° or larger and less than 60°, a median value of the elevation range 371 is 50°, and when the offset value acquired through the fourth fully connected layer 390 is +5, the processor 110 may acquire an output indicating that the elevation 392 is 55°. The foregoing fourth fully connected layer 390 is merely an example, and the present disclosure is not limited thereto.

According to the exemplary embodiment of the present disclosure, the processor 110 may acquire the elevations of the coordinate system of the image acquisition device and the object coordinate system by using the third fully connected layer or the fourth fully connected layer. The present disclosure accurately computes an angle difference between the coordinate system of the image acquisition device and the coordinate system of the object in the case where the image acquisition device and the object are placed on different planes, as well as the case where the image acquisition device and the object are placed on the same plane, so that it is possible to acquire a 3D bounding box having high accuracy and correct a distortion of an image by performing the calibration based on the acquired 3D bounding box. Accordingly, when the method of the present disclosure is used in a speed detection camera, it is possible to match a distance between pixels in an image with an actual distance with high accuracy, thereby measuring a speed of a car with high accuracy. The foregoing matter is merely an example, and the present disclosure is not limited thereto.

By performing the calibration of the present disclosure, it is possible to match coordinates of an actual 3D space and coordinates of a 2D image with high accuracy. Accordingly, it is possible to accurately measure a speed of a vehicle by correcting a distortion of the image acquired by using the image acquisition device through matching with high accuracy. For example, when a speed of a car travelling a curvy road is measured, a distortion may be generated during a process of acquiring the curvy travelling road in the form of a 2D image, so that it is impossible to measure an accurate speed of the car. Further, the speed detection camera is located at a higher position than that of the car travelling the road, so that a difference in altitude may be generated. The calibration of the present disclosure considers an elevation, so that it is possible to correct the distortion of the image with high accuracy. Accordingly, it is possible to accurately measure a speed of a car for images input in various environments through the calibration of the present disclosure.

According to the exemplary embodiment of the present disclosure, the processor 110 may compute a distance between the image acquisition device and a reference point based on bounding box information on each of at least one object. The reference point may include predetermined coordinates of a 3D actual space. Accordingly, the processor 110 may compute the distance between the image acquisition device and the reference point by using a measuring device. The measuring device may include a device measuring a distance by using a laser. Further, the processor 110 may acquire a distance between the image acquisition device and the reference point stored in the memory 130. The foregoing matter is merely an example, and the present disclosure is not limited thereto.

According to the exemplary embodiment of the present disclosure, the processor 110 may compute a scale that is a ratio of a size of an object in a coordinate system of an image and a size of an object in the coordinate system of the image acquisition device. The size of the object in the coordinate system of the image may include a size expressed in the unit of a pixel. The size of the object in the coordinate system of the image acquisition device may include an actual size of the object. For example, the actual size of the object in the coordinate system of the image acquisition device may be 10 m. The actual size of the object in the coordinate system of the image acquisition device may be acquired from actual size information on the object stored in the memory 130. For example, when an object in the coordinate system in the image acquisition device is a car, it is possible to acquire an actual size of the car based on length, width, and height information on the car stored in the memory 130. Accordingly, for example, when a size of an object in the coordinate system of the image is 200 pixels and an actual size of the object in the coordinate system of the image acquisition device is 10 m, the processor 110 may acquire a scale indicating that one pixel in the coordinate system of the image is 5 cm in the coordinate system of the image acquisition device. The foregoing scale is merely an example, and the present disclosure is not limited thereto.

According to the exemplary embodiment of the present disclosure, the processor 110 may convert the coordinate system of the image into the coordinate system of the image acquisition device, and compute a distance between the image acquisition device and a reference point based on the coordinate system of the image acquisition device. The coordinate system of the image may include the coordinate system in which an image is expressed by using two axes. The coordinate system of the image acquisition device may include the coordinate system expressed by using three axes. The foregoing coordinate system of the image and coordinate system of the image acquisition device are merely examples, and the present disclosure is not limited thereto.

According to the exemplary embodiment of the present disclosure, the processor 110 may convert a coordinate system of an image into the coordinate system of the image acquisition device by using a pinhole camera model. The pinhole camera model may be a model serving as a means which matches a point in a 3D space and a point in a 2D space. The foregoing pinhole camera model is merely an example, and the present disclosure is not limited thereto.

According to the exemplary embodiment of the present disclosure, the processor 110 may convert a coordinate system of an image to the coordinate system of the image acquisition device by using a first matrix including the image acquisition device information and a second matrix including the rotation angle information. The foregoing conversion operation is merely an example, and the present disclosure is not limited thereto.

According to another exemplary embodiment of the present disclosure, the first matrix may include the image acquisition device information. The image acquisition device information may include an internal parameter of the image acquisition device. The internal parameter of the image acquisition device may include at least one of a focal length, a principal point, and an asymmetric coefficient. The focal length may include a distance between a center of a lens included in the image acquisition device and a sensor. The principal point may include a center point of the lens included in the image acquisition device. The asymmetric coefficient may include a coefficient indicating inclination information on a pixel. The first matrix may be a matrix in which a focal length, a principal point, and an asymmetric coefficient are included as the elements of the matrix. Accordingly, the processor 110 may perform the calibration with high accuracy and precision in consideration of an inherent characteristic of each input image device. The foregoing first matrix is merely an example, and the present disclosure is not limited thereto.

According to another exemplary embodiment of the present disclosure, the second matrix may include the rotation angle information. The rotation angle information on the coordinate system of the image acquisition device may include information on an angle difference between the coordinate system of the image acquisition device and the coordinate system of the object. The rotation angle information may include at least one of an azimuth of the coordinate system of the image acquisition device and an elevation of the coordinate system of the image acquisition device. The second matrix may include information indicating an angle difference between the coordinate system of the image acquisition device and the coordinate system of the object as the elements of the matrix. The foregoing second matrix is merely an example, and the present disclosure is not limited thereto.

According to another exemplary embodiment of the present disclosure, the processor 110 may compute each element of the second matrix by using a neural network. The processor 110 may compute an azimuth and/or an elevation by using the convolutional layer, the first fully connected layer, the second fully connected layer, the third fully connected layer, and/or the fourth fully connected layer. The processor 110 may determine each element of the second matrix by using the acquired azimuth and/or the elevation. Accordingly, it is possible to perform the calibration with high accuracy and precision by computing the azimuth and/or the elevation through the neural network and determining the second matrix. The foregoing matter is merely an example, and the present disclosure is not limited thereto.

According to another exemplary embodiment of the present disclosure, the second matrix may include parallel movement information. The parallel movement information may be information for matching an origin point of the coordinate system of the image acquisition device and an origin point of the object. The second matrix may include the parallel movement information as the element of the matrix. The foregoing parallel movement information is merely an example, and the present disclosure is not limited thereto.

According to the exemplary embodiment of the present disclosure, the processor 110 may compute an intermediate result value by calculating the coordinate system of the image and an inverse matrix of the first matrix and convert the coordinate system of the image to the coordinate system of the image acquisition device by calculating the computed intermediate result value and an inverse matrix of the second matrix. The converted coordinate system of the image acquisition device may include information on a distance between the image acquisition device and the reference point. The processor 110 may determine that a value of a z-axis 480 in the coordinate system of the image acquisition device acquired as a result of the calculation has the information on the distance between the image acquisition device and the reference point. Accordingly, when a coordinate value of the coordinate system of the image acquisition device acquired as the result of the calculation is (3,5,8,1), the processor 110 may determine that 8 has the information on the distance between the image acquisition device and the reference point. Accordingly, the processor 110 may determine a coordinate system of a reference object by comparing the acquired distance information and an actual distance between the image acquisition device and the reference point. The foregoing matter is merely an example, and the present disclosure is not limited thereto.

According to the exemplary embodiment of the present disclosure, the processor 110 may select a reference object serving as a reference for performing the calibration based on a predetermined reference.

According to the exemplary embodiment of the present disclosure, the predetermined reference may include a reference determined based on a statistic of the distance between the image acquisition device and the reference point computed based on the bounding box information on each of at least one object. The statistic may include an average value, a median value, variance, standard deviation, and the like of the distance between the image acquisition device and the reference point for each object computed based on the bounding box information on each of at least one object. The foregoing matter is merely an example, and the present disclosure is not limited thereto.

According to another exemplary embodiment of the present disclosure, the statistic may include an average value of the distance between the image acquisition device and the reference point computed based on the bounding box information on the selected objects. The selected objects may be selected through a process described below. The processor 110 may arrange the distance between the image acquisition device and the reference point computed based on the bonding box information on each of at least one object based on a predetermined reference (for example, an ascending or descending order). The processor 110 may select an object in order (for example, top 30% of the objects close to the median value) of approaching a median value based on the median value (for example, an average value and a median value) of the arranged distance between the image acquisition device and the reference point computed based on the bounding box information on each of at least one object. The reference object may be selected through a process described below. The processor 110 may also select an object having the smallest difference with the average value of the distance between the image acquisition device and the reference point computed based on the bounding box information on the selected objects as a reference object. The foregoing matter is merely an example, and the present disclosure is not limited thereto.

According to another exemplary embodiment of the present disclosure, the predetermined reference may include a reference determined based on a difference between the actual distance between the image acquisition device and the reference point and the computed distance between the image acquisition device and the reference point. For example, the processor 110 may select at least one reference object in order from the smallest difference between the actual distance between the image acquisition device and the reference point and the computed distance between the image acquisition device and the reference point. Otherwise, the processor 110 may select a reference object based on a distribution chart of at least one computed distance between the image acquisition device and the reference point based on the actual distance between the image acquisition device and the reference point. For example, when the distribution chart is a normal distribution chart, the processor 110 may select at least one object in which a distance difference is 1 cm or less based on the actual distance between the image acquisition device and the reference point as a reference object. The foregoing predetermined reference is merely an example, and the present disclosure is not limited thereto.

According to the exemplary embodiment of the present disclosure, the processor 110 may perform the calibration based on the reference object. The processor 110 may compute 3D bounding box information on the reference object. The processor 110 may compute a distance between the image acquisition device and the reference point based on the 3D bounding box information on the reference object. Accordingly, the processor 110 may correct a distortion of the image by performing the calibration based on the computed distance between the image acquisition device and the reference point. The foregoing calibration is merely an example, and the present disclosure is not limited thereto.

According to the exemplary embodiment of the present disclosure, the processor 110 may recognize an object through a 3D bounding box to perform the calibration with higher accuracy. Further, the processor 110 may more accurately correct the distortion of the image in consideration of even a height difference between an input image device and the object in the 3D space. Further, positions formed by projecting 3D points to a 2D image may be acquired with high precision, and similarly, 3D coordinates may be acquired by means of coordinates of a 2D image with high precision. Accordingly, the processor 110 may accurately compute a speed of a car travelling a curve road at a location at which the image input device is higher than the car that is the object. The foregoing matter is merely an example, and the present disclosure is not limited thereto.

According to the exemplary embodiment of the present disclosure, the processor 110 may perform the calibration on the image acquisition device based on at least a part of the bounding box information. The processor 110 may compute center coordinates of the object based on the bounding box information on each of at least one object. The center coordinates of the object may include at least one of a first coordinate component computed based on the coordinates and the scale of the object in the coordinate system of the image and a second coordinate component including a distance between the image acquisition device and a plane including the center coordinates of the object. The first coordinate component may include a component computed based on the coordinates and the scale of the object in the coordinate system of the image. The coordinate component may include at least one coordinate component included in the coordinates of the coordinate system. For example, the first coordinate component may include an X-coordinate component and a Y-coordinate component in the coordinates (X, Y, Z) in the 3D coordinate system. The coordinate system of the image may include the coordinate system in which an image is expressed by using two axes. The coordinate system of the image acquisition device may include the coordinate system expressed by using three axes. The scale may include a ratio of a size of an object in the coordinate system of the image and a size of an object in the coordinate system of the image acquisition device. The processor 110 may compute the first coordinate component by calculating the coordinates and the scale of the object in the coordinate system of the image. The processor 110 may calculate the coordinates (x, y) and the scale of the object in the coordinate system of the image and acquire an X-coordinate component and a Y-coordinate component in the coordinates (X, Y, Z) in the coordinate system of the image acquisition device. For example, the coordinates of the object in the coordinate system of the image may include (3 pixels, 4 pixels). The scale may include the scale indicating that one pixel in the coordinate system of the image is 5 cm in the coordinate system of the image acquisition device. The processor 110 may compute the first coordinate component, (15 cm, 20 cm) by calculating the coordinates and the scale of the object in the coordinate system of the image. The second coordinate component may include a distance between the image acquisition device and the plane including the center coordinates of the object. The second coordinate component may include a distance between a plane including the center coordinates of the object in a plane in which a line having a direction which the image acquisition device faces is a perpendicular line and the image acquisition device. The second coordinate component may include a distance in which a distance (for example, the shortest distance) between a plane including the center coordinates of the object in a plane in which a line having a direction which the image acquisition device faces is a perpendicular line and the image acquisition device is 50 cm. The processor 110 may compute a distance between a plane including the center coordinates of the object and the image acquisition device based on the rotation angle information on the coordinate system of the image acquisition device included in the bounding box information. The processor 110 may compute a distance between a plane including the center coordinates of the object and the image acquisition device based on the coordinate system 410 of the image, the scale 420, the first matrix 430 including the image acquisition device information, and the second matrix 450 including the rotation angle information illustrated in FIG. 4. As illustrated in FIG. 4, the processor 110 may acquire a coordinate system 490 of the image acquisition device by calculating the inverse matrix of the first matrix 430 and the inverse matrix of the second matrix 450, and the scale 420 existing in the left side, and the coordinate system 410 of the image. A value of the z-axis 480 included in the coordinate system 490 of the image acquisition device may include a distance between the plane including the center coordinates of the object and the image acquisition device. The coordinate component may include at least one coordinate component included in the coordinates of the coordinate system. For example, the second coordinate component may include a Z-coordinate component in the coordinates (X, Y, Z) in the 3D coordinate system. Accordingly, the processor 110 may compute a value, that is, the first coordinate component is (15 cm, 20 cm) and the second coordinate component is 50 cm, and compute the center coordinates of the object as (15 cm, 20 cm, 50 cm). The foregoing center coordinates of the object is merely an example, and the present disclosure is not limited thereto.

According to the exemplary embodiment of the present disclosure, the processor 110 may determine a reference plane serving as a reference for performing the calibration based on the center coordinates of at least one object. The processor 110 may compute a third matrix and a fourth matrix for determining a reference plane. The processor 110 may compute the third matrix including the first coordinate component in the center coordinates of at least one object. The third matrix may include at least one first coordinate component. The center coordinates of at least one object may include (X1, Y1, Z1), (X2, Y2, Z2), (X3, Y3, Z3), (X4, Y4, Z4), (X5, Y5, Z5), . . . , and (Xn, Yn, Zn). At least one first coordinate component may include (X1, Y1), (X2, Y2), (X3, Y3), (X4, Y4), (X5, Y5), . . . , and (Xn, Yn). Accordingly, the third matrix may include $$\begin{bmatrix} X1 & Y1 & C \\ X2 & Y2 & C \\ X3 & Y3 & C \\ \ldots \\ Xn & Yn & C \end{bmatrix}.$$

C may include a predetermined consonant. The processor 110 may compute the fourth matrix including the second coordinate component in the center coordinates of at least one object. The fourth matrix may include at least one second coordinate component. The center coordinates of at least one object may include (X1, Y1, Z1), (X2, Y2, Z2), (X3, Y3, Z3), (X4, Y4, Z4), (X5, Y5, Z5), . . . , and (Xn, Yn, Zn). At least one second coordinate component may include Z1, Z2, Z3, Z4, Z5, . . . , and Zn. Accordingly, the fourth matrix may include $$\begin{bmatrix} Z1 \\ Z2 \\ Z3 \\ \ldots \\ Zn \end{bmatrix}.$$

The processor 110 may determine a reference plane based on the third matrix and the fourth matrix. The processor 110 may determine a plane through a plane equation (for example, aX+bY+cZ=d or aX+bY+d=Z). The processor 110 may determine a plane by computing a, b, and d in the plane equation aX+bY+d=Z. The processor 110 may determine a reference plane by computing a, b, and d in the plane equation aX+bY+d=Z by using the third matrix and the fourth matrix. The processor 110 may compute a, b, and d through the equation $$\begin{bmatrix} X1 & Y1 & C \\ X2 & Y2 & C \\ X3 & Y3 & C \\ \ldots \\ Xn & Yn & C \end{bmatrix} * \begin{bmatrix} a \\ b \\ d \end{bmatrix} = \begin{bmatrix} Z1 \\ Z2 \\ Z3 \\ \ldots \\ Zn \end{bmatrix}$$

including the third matrix and the fourth matrix. The processor 110 may compute a, b, and d by calculating an inverse matrix of the third matrix and the fourth matrix. The inverse matrix of the third matrix may include a pseudo inverse matrix. The pseudo inverse matrix may include a matrix used for computing an inverse matrix for the matrix, not a square matrix. Accordingly, the processor 110 may determine a reference plane by computing values of a, b, and d in aX+bY+d=Z by using the third matrix and the fourth matrix. The foregoing matter is merely an example, and the present disclosure is not limited thereto.

According to the exemplary embodiment of the present disclosure, the processor 110 may perform the calibration based on the reference plane. The processor 110 determines the reference plane by computing the values of a, b, and d in aX+bY+d=Z by using the third matrix and the fourth matrix, thereby performing the calibration based on the reference plane. The processor 110 may project the coordinates of the coordinate system of the image as the coordinates of the coordinate system of the image acquisition device with high accuracy by using the determined reference plane. The processor 110 may also correct a distortion of the image with high accuracy by using the determined reference plane. The foregoing matter is merely an example, and the present disclosure is not limited thereto.

According to the present disclosure, the plane serving as the reference of the calibration is determined by using at least one object, so that it is possible to perform the calibration with high accuracy. The processor 110 may determine the reference plane according to the method of the present disclosure to make the distance between the center coordinates of at least one object and the reference plane be minimum. The distance between the center coordinates of at least one object and the reference plane becomes minimum, so that the processor 110 may perform the calibration with high accuracy by using the plurality of objects. Accordingly, the processor 110 may correct the distortion of the image with high accuracy through the reference plane of the present disclosure. Further, the processor 110 may acquire locations of the 3D points projected to the 2D image with high accuracy by using the reference plane of the present disclosure, and similarly, may acquire the 3D coordinates with the coordinates of the 2D image with high accuracy.

Figure 2:
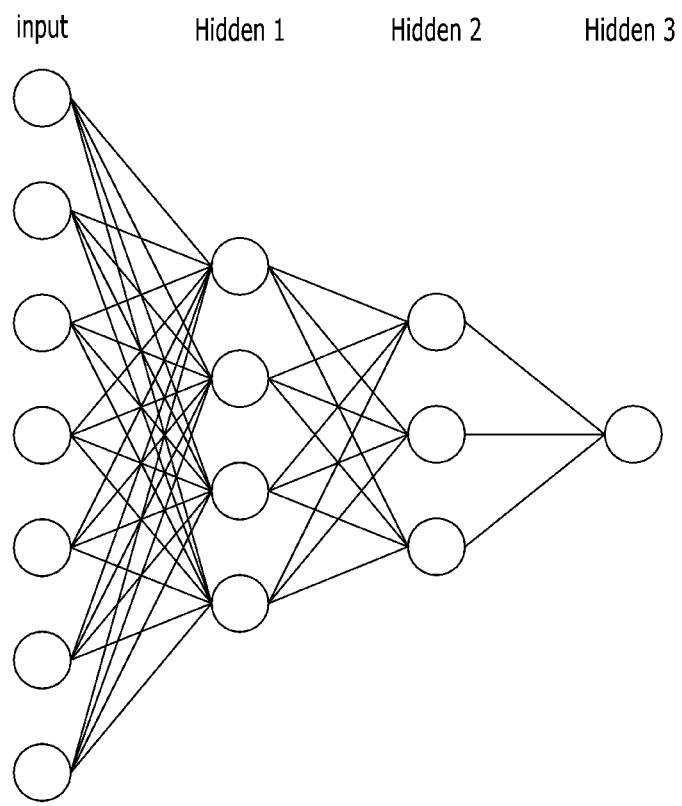
FIG. 2 is a schematic diagram illustrating a network function that is a basis of an object detection model for performing calibration according to the exemplary embodiment of the present disclosure.

FIG. 2 is a schematic diagram illustrating a network function that is a basis of an object detection model for performing calibration according to the exemplary embodiment of the present disclosure.

Throughout the present specification, a calculation model, a nerve network, a network function, and a neural network may be used as the same meaning. The neural network may be formed of a set of mutually connected calculation units which may be generally referred as nodes. The nodes may also be referred to as neurons. The neural network consists of at least one node. The nodes (or neurons) configuring the neural networks may be mutually connected through one or more links.

Within the neural network, one or more nodes connected through the link may relatively form a relationship between an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on a link. One or more output nodes may be connected to one input node through a link, and a reverse case may also be valid.

In the relationship between an input node and an output node connected through one link, a value of the output node may be determined based on data input to the input node. Herein, a node connecting the input node and the output node may have a weight. The weight may be variable, and in order for the neural network to perform a desired function, the weight may be varied by a user or an algorithm. For example, when one or more input nodes are connected to one output node by links, respectively, a value of the output node may be determined based on values input to the input nodes connected to the output node and a weight set in the link corresponding to each of the input nodes.

As described above, in the neural network, one or more nodes are connected through one or more links to form a relationship of an input node and an output node within the neural network. A characteristic of the neural network may be determined according to the number of nodes and links, a relationship between the nodes and the links, and a value of a weight assigned to each of the links within the neural network. For example, when there are two neural networks, which have the same number of nodes and links and have different weight values between the links, the two neural networks may be recognized to be different from each other.

The neural network may consist of one or more nodes. Some of the nodes configuring the neural network may configure one layer based on distances from the initial input node. For example, a set of nodes, of which distances from the initial input node are n, may configure n layers. The distance from the initial input node may be defined by the minimum number of links, which needs to be passed from the initial input node to a corresponding node. However, the definition of the layer is arbitrary for explanation, and a degree of the layer within the neural network may be defined with a different method from the foregoing method. For example, the layers of the nodes may be defined by a distance from a final output node.

The initial input node may mean one or more nodes, to which data is directly input without passing a link in a relationship with other nodes among the nodes within the neural network. Otherwise, the initial input node may mean nodes having no other input node connected through the links in a relationship between the nodes based on a link within the neural network. Similarly, the final output node may mean one or more nodes having no output node in the relationship with other nodes among the nodes within the neural network. Further, a hidden node may mean a node, not the initial input node and the final output node, configuring the neural network. In the neural network according to the exemplary embodiment of the present disclosure, the number of nodes of the input layer may be the same as the number of nodes of the output layer, and the neural network may have the form in which the number of nodes is decreased and increased again according to the progress from the input layer to the hidden layer. Further, in the neural network according to another exemplary embodiment of the present disclosure, the number of nodes of the input layer may be smaller than the number of nodes of the output layer, and the neural network may have the form in which the number of nodes is decreased according to the progress from the input layer to the hidden layer. Further, in the neural network according to another exemplary embodiment of the present disclosure, the number of nodes of the input layer may be larger than the number of nodes of the output input layer, and the neural network may have the form in which the number of nodes is increased according to the progress from the input layer to the hidden layer. The neural network according to another exemplary embodiment of the present disclosure may have the form in which the foregoing neural networks are combined.

A deep neural network (DNN) may mean a neural network including a plurality of hidden layers, in addition to an input layer and an output layer. When the DNN is used, it is possible to recognize a latent structure of data. That is, it is possible to recognize a latent structure (for example, the kind of object included in a picture, contents and emotion included in writing, contents and emotion included in a voice, and the like) of a picture, writing, a video, a voice, and music. The DNN may include a convolutional neural network (CNN), a recurrent neural network (RNN), an auto encoder, a Generative Adversarial Network (GAN), a restricted Boltzmann machine (RBM), a deep belief network (DBN), a Q network, a U network Siamese network, and the like. The description of the DNN is merely an example, and the present disclosure is not limited thereto.

According to the exemplary embodiment of the present disclosure, the network function may also include an auto encoder. The auto encoder may be a kind of artificial neural network for outputting output data similar to input data. The auto encoder may include at least one hidden layer, and the odd number of hidden layers may be disposed between the input and output layers. The number of nodes in each layer may be reduced from the number of nodes in the input layer to an intermediate layer called a bottleneck layer (encoding), and then expanded symmetrically to the reduction from the bottleneck layer to the output layer (symmetric to the input layer). The nodes of the dimension reduction layer and the dimension restoration layer may or may not be symmetrical. The auto encoder may perform nonlinear dimensional reduction. The number of input layers and the number of output layers may correspond to the number of sensors left after a post-treatment of the input data. In the auto encoder structure, the number of nodes of the hidden layer included in the encoder may have a structure that decreases away from the input layer. When the number of nodes of the bottleneck layer (the layer having the fewest nodes located between the encoder and the decoder) is too small, the sufficient amount of information may not be transferred, so that the specific number or more of nodes (for example, a half or more of the nodes of the input layer) may also be maintained.

The neural network may be learned by at least one scheme of supervised learning, unsupervised learning, and semi-supervised learning. The learning of the neural network is for the purpose of minimizing an error of an output. In the learning of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data.

That is, for example, the training data in the supervised learning for data classification may be data, in which a category is labelled to each of the training data. The labelled training data is input to the neural network and the output (category) of the neural network is compared with the label of the training data to calculate an error. For another example, in the case of the unsupervised learning related to the data classification, training data that is an input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A variation rate of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the learning of the neural network, the training data may be generally a subset of actual data (that is, data to be processed by using the learned neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. The overfitting may act as a reason of increasing an error of a machine learning algorithm. In order to prevent the overfitting, various optimizing methods may be used. In order to prevent the overfitting, a method of increasing training data, a regularization method, a dropout method of omitting a part of nodes of the network during the learning process, and the like may be applied.

FIG. 3 is a block diagram for describing an operation for acquiring rotation angle information for performing the calibration according to the exemplary embodiment of the present disclosure.

As illustrated in FIG. 3, the computing device 100 may compute the azimuth range 331, the azimuth 352, the elevation range 371, and the elevation 392 by using the convolutional layer 310, the first fully connected layer 330, the second fully connected layer 350, the third fully connected layer 370, and the fourth fully connected layer 390.

According to the exemplary embodiment of the present disclosure, the computing device 100 may extract a feature of an image by using the convolutional layer 310. According to the exemplary embodiment of the present disclosure, the convolutional layer 310 may include a neural network having at least one independent parameter. For example, the convolutional layer connected to the first fully connected layer 330 may be different from the convolutional layer connected to the third fully connected layer 370. According to another exemplary embodiment of the present disclosure, the fully connected layer 330, the second fully connected layer 350, the third fully connected layer 370, and the fourth fully connected layer 390 may have a structure connected to one convolutional layer 310. The foregoing connection structure is merely an example, and the present disclosure is not limited thereto.

According to the exemplary embodiment of the present disclosure, the computing device 100 may acquire an azimuth range by inputting the extracted feature to the first fully connected layer 330. The first fully connected layer 330 may include a neural network for classifying the azimuth range 331. The azimuth range 331 may include a range in which the azimuth of the coordinate system of the image acquisition device based on the object coordinate system is included. The foregoing first fully connected layer 330 is merely an example, and the present disclosure is not limited thereto.

According to the exemplary embodiment of the present disclosure, the computing device 100 may acquire the azimuth 352 of the coordinate system of the image acquisition device within the azimuth range acquired in the first fully connected layer 330 by inputting the extracted feature to the second fully connected layer 350. The second fully connected layer 350 may include a neural network for acquiring the azimuth 352 of the coordinate system of the image acquisition device within the azimuth range 331. The computing device 100 may compute an offset value based on a median value of the azimuth angle range. Accordingly, the computing device 100 may acquire the azimuth 352 of the coordinate system of the image acquisition device by calculating the offset value computed based on the median value of the azimuth range by using the second fully connected layer. The foregoing second fully connected layer 350 is merely an example, and the present disclosure is not limited thereto.

According to the exemplary embodiment of the present disclosure, the computing device 100 may acquire the elevation range 371 by inputting the extracted feature to the third fully connected layer 370. The third fully connected layer 370 may include a neural network for classifying the elevation range 371. The elevation range 371 may include a range in which the elevation of the coordinate system of the image acquisition device based on the object coordinate system is included. The foregoing third fully connected layer 370 is merely an example, and the present disclosure is not limited thereto.

According to the exemplary embodiment of the present disclosure, the computing device 100 may acquire the elevation 392 of the coordinate system of the image acquisition device within the elevation range 371 acquired in the third fully connected layer 370 by inputting the extracted feature to the fourth fully connected layer 390. The fourth fully connected layer may include a neural network for acquiring the elevation 392 of the coordinate system of the image acquisition device within the elevation range 371. The computing device 100 may compute an offset value based on a median value of the elevation range 371. Accordingly, the processor 110 may calculate an offset value computed based on the median value of the elevation range 371 by using the fourth fully connected layer 390 to acquire the elevation 392 of the coordinate system of the image acquisition device. The foregoing fourth fully connected layer 390 is merely an example, and the present disclosure is not limited thereto.

According to the exemplary embodiment of the present disclosure, the computing device 100 may perform normalization based on the value acquired from the second fully connected layer 350 and/or the fourth fully connected layer 390. The normalization may include a means used for preventing overfitting of the deep learning network. The normalization may include, for example, L1 norm and L2 norm. The computing device 100 may prevent the overfitting by normalizing 351 the output result by using the second fully connected layer 350. The processor 110 may also normalize 391 the output result by using the fourth fully connected layer 390 to prevent the overfitting. Accordingly, it is possible to compute the azimuth and the elevation with high accuracy through the normalization.

FIG. 4 is an example diagram for describing an operation of converting an image coordinate system to a coordinate system of an image acquisition device according to the exemplary embodiment of the present disclosure.

FIG. 4 illustrates values of a scale 420, a coordinate system 410 of an image, a first matrix 430, a second matrix 450, a coordinate system 490 of the image acquisition device, and a z-axis 480. The coordinate system 410 of the image may include a coordinate system in which an image is expressed by using two axes. The coordinate system 490 of the image acquisition device may include a coordinate system expressed by using three axes.

According to the exemplary embodiment of the present disclosure, the first matrix may include the image acquisition device information. The image acquisition device information may include an internal parameter of the image acquisition device. The internal parameter of the image acquisition device may include at least one of a focal length, a principal point, and an asymmetric coefficient. The focal length may include a distance between a center of a lens included in the image acquisition device and a sensor. The principal point may include a center point of the lens included in the image acquisition device. The asymmetric coefficient may include a coefficient indicating inclination information on a pixel. The first matrix may be a matrix in which a focal length, a principal point, and an asymmetric coefficient are included as the elements of the matrix. The foregoing first matrix is merely an example, and the present disclosure is not limited thereto.

According to the exemplary embodiment of the present disclosure, the second matrix may include rotation angle information. The rotation angle information on the coordinate system of the image acquisition device may include information on an angle difference between the coordinate system of the image acquisition device and the coordinate system of the object. The rotation angle information may include at least one of an azimuth of the coordinate system of the image acquisition device and an elevation of the coordinate system of the image acquisition device. The second matrix may include information indicating an angle difference between the coordinate system of the image acquisition device and the coordinate system of the object as the elements of the matrix.

According to another exemplary embodiment of the present disclosure, the computing device 100 may compute each element of the second matrix by using the neural network. The computing device 100 may compute an azimuth and/or an elevation by using the convolutional layer, the first fully connected layer, the second fully connected layer, the third fully connected layer, and/or the fourth fully connected layer. The computing device 100 may determine each element of the second matrix by using the acquired azimuth and/or the elevation. Accordingly, it is possible to perform the calibration with high accuracy and preciseness by computing the azimuth and/or the elevation through the neural network and determining the second matrix. The foregoing matter is merely an example, and the present disclosure is not limited thereto.

According to the exemplary embodiment of the present disclosure, the scale 420 may be a value determined based on a ratio of a size of an object in the coordinate system 410 of the image and a size of an object in the coordinate system 490 of the image acquisition device. The foregoing scale is merely an example, and the present disclosure is not limited thereto.

According to the exemplary embodiment of the present disclosure, the computing device 100 may perform the calculation by passing the first matrix 430 and the second matrix 450 to the left side where the coordinate system 410 of the image exists in order to acquire the coordinate system 490 of the image acquisition device. When the computing device 100 passes the first matrix 430 and the second matrix 450 to the left side, the computing device 100 may calculate the coordinate system of the image acquisition device by using an inverse matrix of the first matrix 430 and an inverse matrix of the second matrix 450.

According to the exemplary embodiment of the present disclosure, the computing device 100 may compute an intermediate result value by calculating the coordinate system of the image and an inverse matrix of the first matrix and calculate the scale 420 of the result value acquired by calculating the calculated intermediate result value and an inverse matrix of the second matrix to convert the coordinate system of the image to the coordinate system of the image acquisition device. The converted coordinate system 490 of the image acquisition device may include information on a distance between the image acquisition device and the reference point. The computing device 100 may determine that a value of the z-axis 480 in the coordinate system of the image acquisition device acquired as a result of the calculation has the information on the distance between the image acquisition device and the reference point. For example, when the value of the z-axis 480 in the coordinate value of the coordinate system of the image acquisition device is 10, a distance between the image acquisition device and the reference point may be 10. The foregoing matter is merely an example, and the present disclosure is not limited thereto.

Figure 5:
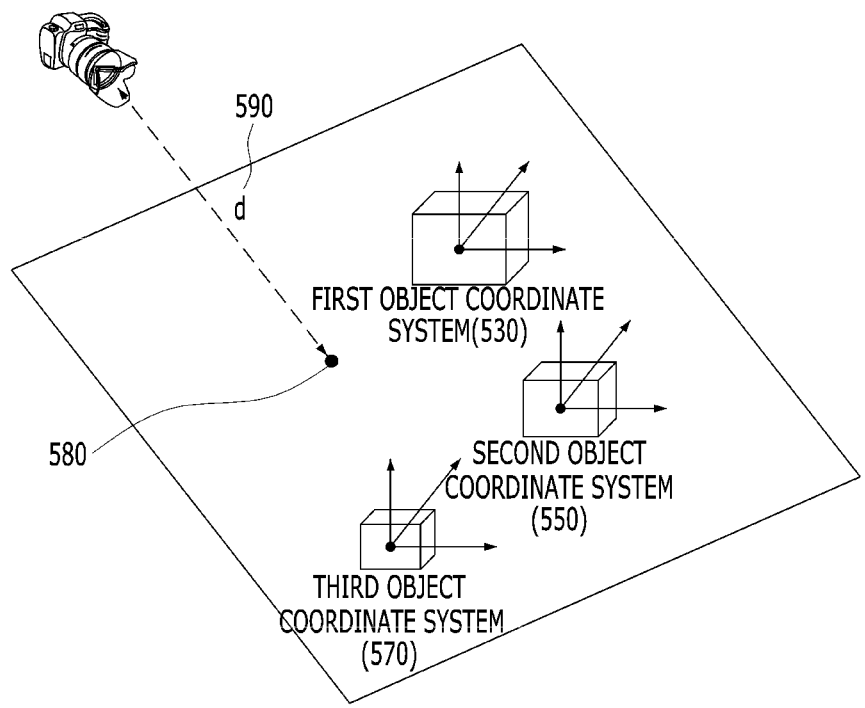
FIG. 5 is an example diagram for describing an operation of performing calibration according to the exemplary embodiment of the present disclosure.

FIG. 5 is an example diagram for describing an operation for performing the calibration according to the exemplary embodiment of the present disclosure.

Referring to FIG. 5, an image acquisition device 510 exists, and a reference point 580 exists on a plane, so that an actual distance between the image acquisition device 510 and the reference point 580 is d 590. Further, a first object coordinate system 530, a second object coordinate system 550, and a third object coordinate system 570 are illustrated on the same plane. The image acquisition device 510, the first object coordinate system 530 and the second object coordinate system 550, and the third object coordinate system 570 may be located on different planes, and accordingly, an elevation of the image acquisition device 510 may be larger than 0.

According to the exemplary embodiment of the present disclosure, the first object coordinate system 530, the second object coordinate system 550, and the third object coordinate system 570 may include the coordinate systems computed based on the 3D bounding box information acquired by using the object detection model by the computing device 100. The foregoing coordinate system is a merely example, and the present disclosure is not limited thereto.

According to the exemplary embodiment of the present disclosure, the computing device 100 may compute rotation angle information on the coordinate system of the image acquisition device 510 based on the first object coordinate system 530. Further, the computing device 100 may compute the scale 420 based on the first object coordinate system 530. The computing device 100 may compute the scale based on length, width, and height information on the vehicle object stored in the memory 130 and pixel information on the image (for example, the computing device 100 may compute the scale indicating that 1 pixel is 3 cm). The computing device 100 may compute an estimated distance d1 between the image acquisition device 510 and the reference point 580 based on the first object coordinate system by using the computed rotation angle information and the scale 420. Similarly, the computing device 100 may compute a scale in a relationship between the image acquisition device 510 and the second object coordinate system 550, an estimated distance d2 between the image acquisition device 510 and the reference point 580, a scale in a relationship between the image acquisition device 510 and the third object coordinate system 570 and an estimated distance d3 between the image acquisition device 510 and the reference point 580. The foregoing matter is merely an example, and the present disclosure is not limited thereto.

According to the exemplary embodiment of the present disclosure, the computing device 100 may acquire the scale for the coordinate system of each of the objects, and a pair of estimated distances (for example, (the scale s, the computed estimated distance between the image acquisition device 510 and the reference point 580)) between the image acquisition device 510 and the reference point 580. The computing device 100 may acquire, for example, (51, d1) for the first object coordinate system, (S2, d2) for the second object coordinate system, and (S3, d3) for the third object coordinate system. The foregoing matter is merely an example, and the present disclosure is not limited thereto.

According to the exemplary embodiment of the present disclosure, the computing device 100 may select a coordinate system of a reference object which is to be a reference for the calibration based on a statistic of the distance between the image acquisition device and the reference point computed based on the coordinate system of the object. Accordingly, when the computing device 100 computes, for example, an average value of d1, d2, and d3 and a value having the smallest difference with the average value is d2, the computing device 100 may select a pair (S2, d2). When the computing device 100 selects the pair (S2, d2), the second object coordinate system may be selected as the reference coordinate system. The computing device 100 may perform the calibration having high accuracy and precision by selecting the second object coordinate system as the reference coordinate system. The foregoing matter is merely an example, and the present disclosure is not limited thereto.

According to the exemplary embodiment of the present disclosure, the computing device 100 may select a coordinate system of a reference object which is to be a reference for the calibration based on the distance between the image acquisition device and the reference point computed based on the coordinate system of the object and the actual distance between the image acquisition device and the reference point.

According to the exemplary embodiment of the present disclosure, for example, when the reference point 580 exists on a plane and an actual distance d 590 between the image acquisition device 510 and the reference point 580 is 10, a distance in a relationship with the first object coordinate system 530 is 9, a distance in a relationship with the second object coordinate system 550 is 7, and a distance in a relationship with the third object coordinate system 570 is 12, a difference between the first object coordinate system 530 and d 590 is smallest, the computing device 100 may select the first object coordinate system as a reference object coordinate system. When the first object coordinate system is selected as the reference object coordinate system, the computing device 100 may also determine the scale 420 value illustrated in FIG. 4. Accordingly, the computing device 100 may perform the calibration based on the scale 420 computed based on the first object as the reference object and the first object coordinate system. Accordingly, the computing device 100 selects the reference object by computing the distance between the image acquisition device 510 and the reference point 580 by using at least one object and comparing the estimated distance for each reference object with the actual distance, so that the computing device 100 may perform the calibration with high accuracy and precision. The foregoing matter is merely an example, and the present disclosure is not limited thereto.

Figure 6:
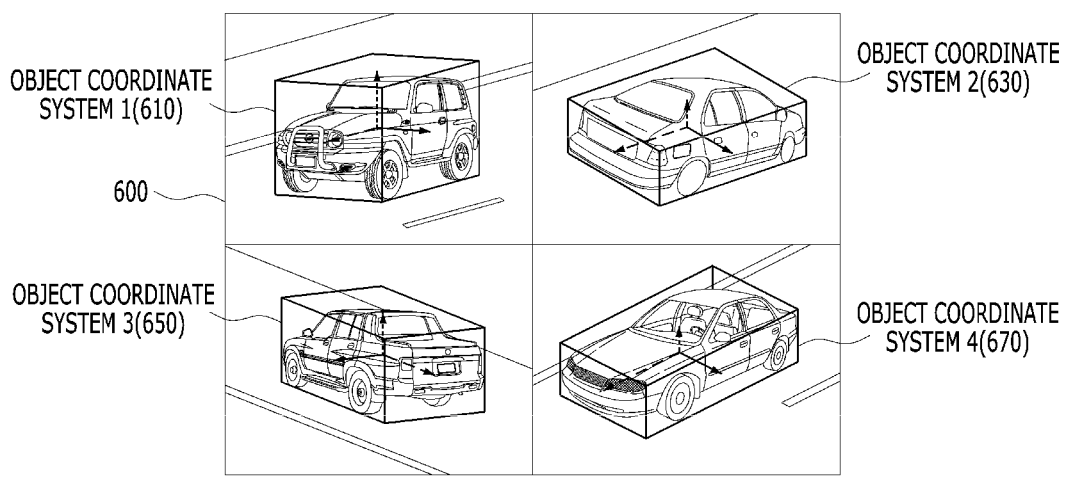
FIG. 6 is an example diagram for describing an operation of performing calibration by using a vehicle object according to the exemplary embodiment of the present disclosure.

FIG. 6 is an example diagram for describing an operation of performing calibration by using a vehicle object according to the exemplary embodiment of the present disclosure.

In FIG. 6, different objects are illustrated. The object may include a vehicle object. The vehicle object may include a car. Referring to FIG. 6, 3D bounding boxes are drawn for cars having various appearances, and the 3D bounding boxes may represent object coordinate system 1 610, object coordinate system 2 630, object coordinate system 3 650, and object coordinate system 4 670.

According to another exemplary embodiment of the present disclosure, in order to recognize an object, a background and a car may be segmented in the unit of a pixel to recognize the car. The computing device may select a specific part of a car, calculate a distance, and then perform the calibration. The computing device 100 may perform the calibration by computing, for example, a distance between the rearview mirrors of the car and a distance between the headlights of the car through the segmentation.

According to the exemplary embodiment of the present disclosure, when the computing device 100 recognizes the object with the 3D bounding box, the computing device 100 may recognize the car with the 3D bounding box by using the object detection model despite a difference in a detailed shape in various appearances of the car. Accordingly, the object detection model does not need to learn for each detailed model of the vehicle, so that images of various types of vehicles may be learned as training data. Accordingly, it is possible to perform the calibration with high accuracy without being affected by a detailed difference in an appearance of a car. Accordingly, the computing device 100 may perform the calibration with high accuracy and precision by using the object recognized with high accuracy.

According to the exemplary embodiment of the present disclosure, cars have various appearances, so that the height, width, length, rearview mirror size, headlight shape, and overall shape of the car may vary from car to car. As indicated by reference numeral 600, the cars illustrated in the object coordinate system 1 610, the object coordinate system 2 630, the object coordinate system 3 650, and the object coordinate system 4 670 have various appearances. However, even though the cars having various appearances are the object detection targets, the car is recognized as the 3D bounding box, so that a lightweight neural network structure and minimum training data may be required for recognizing the car. Further, even when the appearances of the cars are various, a specific part (for example, a rearview mirror) of the car is not sufficiently learned, and thus it is difficult to recognize the specific part, the computing device 100 recognizes the car as the 3D bounding box and selects a reference for performing the calibration, thereby performing the calibration with high accuracy.

Figure 7:
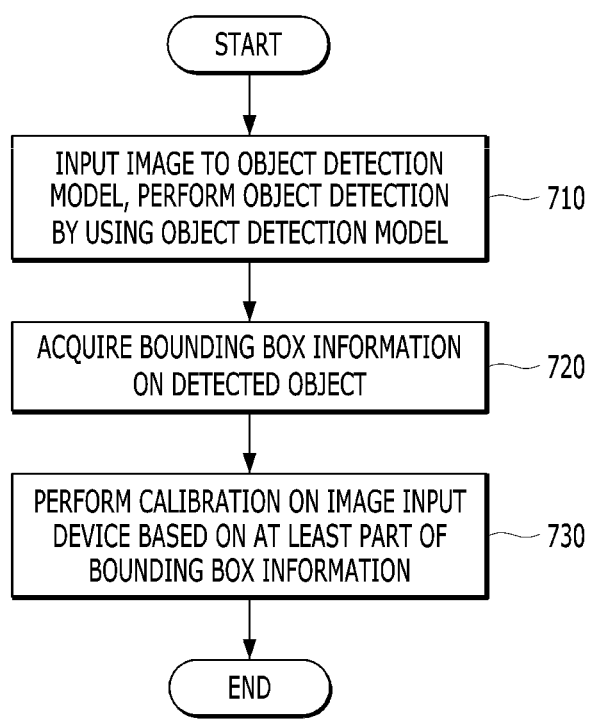
FIG. 7 is a flow chart of a calibration method according to the exemplary embodiment of the present disclosure.

FIG. 7 is a flow chart of a calibration method according to an exemplary embodiment of the present disclosure.

The computing device 100 may input an image to an object detection model, and perform object detection by using the object detection model (710). According to the exemplary embodiment of the present disclosure, the object may include a vehicle object.

The computing device 100 may acquire bounding box information on the detected object (720).

According to the exemplary embodiment of the present disclosure, the bounding box information may include 3D bounding box information acquired based on the image.

According to the exemplary embodiment of the present disclosure, the 3D bounding box information may include at least one of information on a coordinate system of the object set based on detailed component information on the object and rotation angle information on the coordinate system of an image acquisition device which acquires an image based on the information on the coordinate system of the object.

According to the exemplary embodiment of the present disclosure, the rotation angle information may include at least one of an azimuth of the coordinate system of the image acquisition device or an elevation of the coordinate system of the image acquisition device.

According to the exemplary embodiment of the present disclosure, the object detection model may include: a convolutional layer which extracts a feature of the image; a first fully connected layer which receives the extracted feature and acquires an azimuth range of the coordinate system of the image acquisition device; and a second fully connected layer which acquires an azimuth of the coordinate system of the image acquisition device within the azimuth range.

According to the exemplary embodiment of the present disclosure, the object detection model may include: the convolutional layer which extracts a feature of the image; a third fully connected layer which inputs the extracted feature and acquires an elevation range of the coordinate system of the image acquisition device; and a fourth fully connected layer which acquires an elevation of the coordinate system of the image acquisition device within the elevation range.

The computing device 100 may perform calibration on the image acquisition device based on at least part of the bounding box information (730).

According to the exemplary embodiment of the present disclosure, the computing device 100 performs the calibration through the 3D bounding box information, thereby acquiring a calibration result with high precision. Further, even though the cars having various appearances are object detection targets, the computing device 100 recognizes the cars as the 3D bounding boxes, so that it is easy to secure a training data required for training a neural network for generating the bounding box. That is, when the computing device 100 performs the calibration by using specification information on individual vehicles, training data configured for individual vehicles is required for recognizing the vehicle. However, according to the exemplary embodiment of the present disclosure, when the vehicle is recognized as the 3D bounding box and the calibration is performed by using the recognized 3D bounding box, there is no need to have training data for each vehicle and the model is trained by using a larger number of combined training data, so that a recognition rate may be increased.

Figure 8:
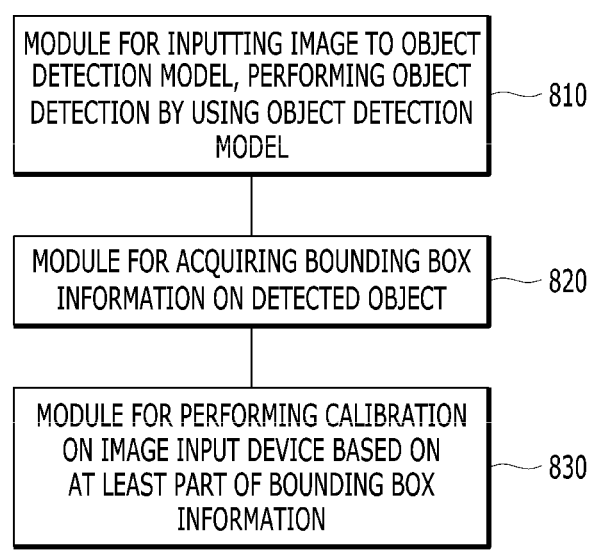
FIG. 8 is a block diagram illustrating modules for performing calibration according to the exemplary embodiment of the present disclosure.

FIG. 8 is a block diagram illustrating modules for performing the calibration according to the exemplary embodiment of the present disclosure.

According to the exemplary embodiment of the present disclosure, the calibration method may be implemented by the modules described below. The calibration method may be implemented by: a module 810 for inputting an image to an object detection model and performing object detection by using the object detection model; a module 820 for acquiring bounding box information on the detected object; and a module 830 for performing calibration on an image acquisition device based on at least part of the bounding box information.

In an alternative exemplary embodiment for performing the calibration, the module 830 for performing the calibration on the image acquisition device based on at least part of the bounding box information may include: a module for computing a distance between the image acquisition device and a reference point based on bounding box information on each of at least one object; a module for selecting a reference object serving as a reference for performing the calibration based on a predetermined reference; and a module for performing the calibration based on the reference object.

In the alternative exemplary embodiment for performing the calibration, the module for computing the distance between the image acquisition device and the reference point based on bounding box information on each of at least one object may include: a module for converting a coordinate system of the image to a coordinate system of the image acquisition device; and a module for computing a distance between the image acquisition device and the reference point based on the coordinate system of the image acquisition device.

In the alternative exemplary embodiment for performing the calibration, the module for computing the distance between the image acquisition device and the reference point based on bounding box information on each of at least one object may include a module for computing a scale that is a ratio of a size of the object in the coordinate system of the image and a size of the object in the coordinate system of the image acquisition device.

In the alternative exemplary embodiment for performing the calibration, the module for converting the coordinate system of the image to the coordinate system of the image acquisition device may include a module for converting the coordinate system of the image to the coordinate system of the image acquisition device by using a first matrix including the information on the image acquisition device and a second matrix including rotation angle information.

In the alternative exemplary embodiment for performing the calibration, the module for converting the coordinate system of the image to the coordinate system of the image acquisition device by using the first matrix including the information on the image acquisition device and the second matrix including rotation angle information may include: a module for computing an intermediate result value by calculating the coordinate system of the image and an inverse matrix of the first matrix; and a module for converting the coordinate system of the image to the coordinate system of the image acquisition device by calculating the computed intermediate result value and an inverse matrix of the second matrix.

In the alternative exemplary embodiment for performing the calibration, the predetermined reference may include at least one of a reference determined based on a statistic of the distance between the image acquisition device and the reference point computed based on the bounding box information on each of at least one object or a reference determined based on a difference between an actual distance between the image acquisition device and the reference point and a computed distance between the image acquisition device and the reference point.

In the alternative exemplary embodiment for performing the calibration, the module 830 for performing the calibration on the image acquisition device based on at least part of the bounding box information may include: a module for computing center coordinates of the object based on the bounding box information on each of at least one object; a module for determining a reference plane serving as a reference for performing the calibration based on the center coordinates of at least one object; and a module for performing the calibration based on the reference plane.

In the alternative exemplary embodiment for performing the calibration, the center coordinates of the object may include at least one of a first coordinate component computed based on the coordinates and the scale of the object in the coordinate system of the image and a second coordinate component including a distance between the image acquisition device and a plane including the center coordinates of the object.

In the alternative exemplary embodiment for performing the calibration, the module for determining the reference plane serving as the reference for performing the calibration based on the center coordinates of at least one object may include: a module for computing a third matrix including the first coordinate component in the center coordinates of at least one object; a module for computing a fourth matrix including the second coordinate component in the center coordinates of at least one object; and a module for determining the reference plane based on the third matrix and the fourth matrix.

According to the exemplary embodiment of the present disclosure, the module for performing the calibration may also be implemented by a means, a circuit, or logic for implementing the computing device. Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations has been generally described above in the functional aspects thereof. Whether the functionality is implemented as hardware or software depends on a specific application or design restraints given to the general system. Those skilled in the art may implement the functionality described by various methods for each of the specific applications, but it shall not be construed that the determinations of the implementation deviate from the range of the contents of the present disclosure.

Figure 9:
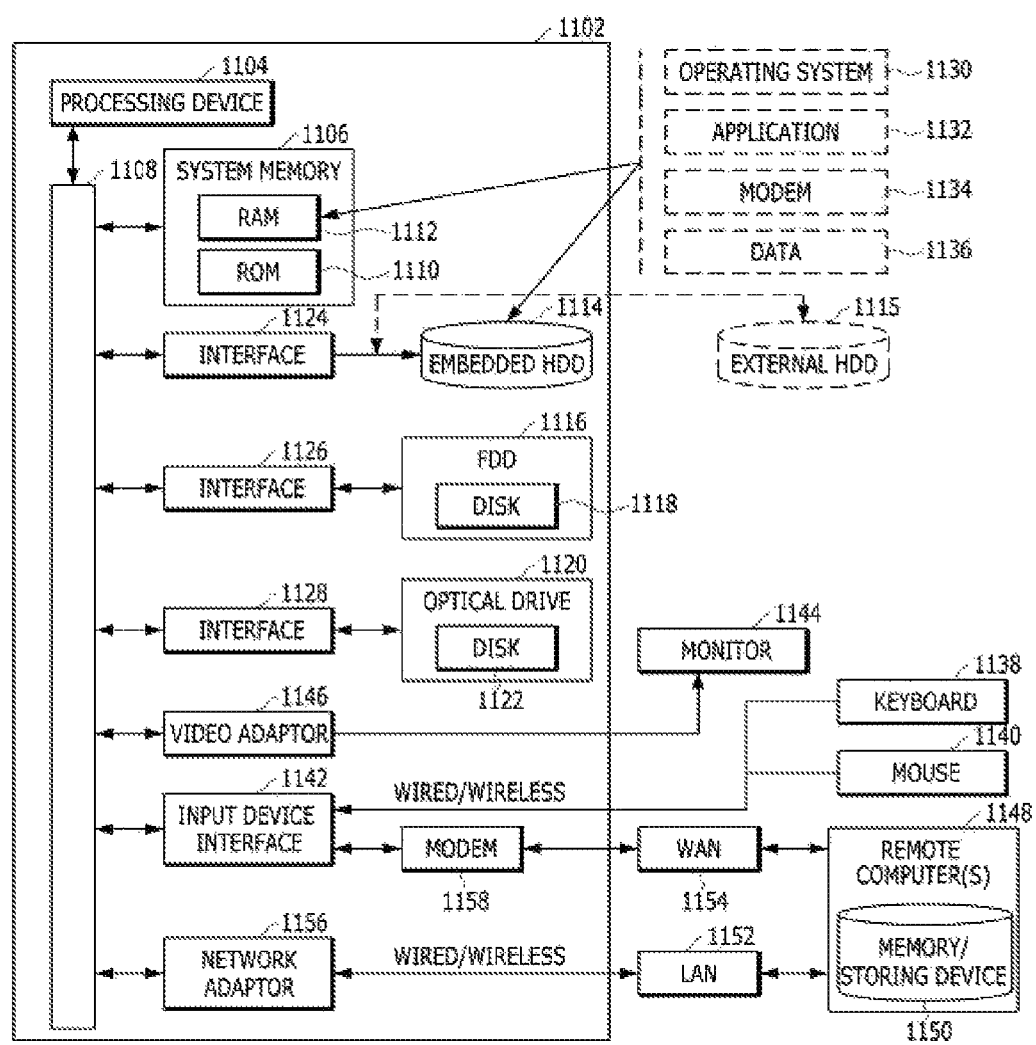
FIG. 9 is a simple and general schematic diagram illustrating an example of a computing environment in which the exemplary embodiments of the present disclosure may be implemented.

FIG. 9 is a simple and general schematic diagram illustrating an example of a computing environment in which the exemplary embodiments of the present disclosure may be implemented.

It is described that the present disclosure may be generally implemented by the computing device 100, but those skilled in the art will appreciate well that the present disclosure may be implemented by a computer executable command executable in one or more computers, in combination with other program modules, and/or in a combination of hardware and software.

In general, a program module includes a routine, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be positioned in both a local memory storage device and a remote memory storage device.

The computer generally includes various computer readable medium. A computer accessible medium may be a computer readable medium regardless of the kind of medium, and the computer readable medium includes volatile and non-volatile media, transitory and non-non-transitory media, portable and non-portable media. As a not-limited example, the computer readable medium may include a computer readable storage medium and a computer readable transport medium. The computer readable storage medium includes volatile and non-volatile media, transitory and non-non-transitory media, portable and non-portable media constructed by a predetermined method or technology, which stores information, such as a computer readable command, a data structure, a program module, or other data. The computer readable storage medium includes a read only memory (RAM), a read only memory (ROM), electrically erasable and programmable ROM (EEPROM), a flash memory, or other memory technologies, a compact disc (CD)-ROM, a digital video disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as a carrier wave or other transport mechanisms, which implement a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various common processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 may be configured for outer mounted usage within a proper chassis (not illustrated), a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of predetermined data in an appropriate digital form. In the description of the computer readable storage media, the HDD, the portable magnetic disk, and the portable optical media, such as a CD, or a DVD, are mentioned, but those skilled in the art will appreciate well that other types of compute readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display device are also connected to the system bus 1108 through an interface, such as a video adapter 1146. In addition to the monitor 1144, the computer generally includes other peripheral output devices (not illustrated), such as a speaker and a printer.

The computer 1102 may be operated in a network environment by using a logical connection to one or more remote computers, such as remote computer(s) 1148, through wired and/or wireless communication. The remote computer(s) 1148 may be a workstation, a computing device computer, a router, a personal computer, a portable computer, a microprocessor-based entertainment device, a peer device, and other general network nodes, and generally includes a plurality of or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adapter 1156. The adapter 1156 may make wired or wireless communication to the LAN 1152 easy, and the LAN 1152 also includes a wireless access point installed therein for the communication with the wireless adapter 1156. When the computer 1102 is used in the WAN networking environment, the computer 1102 may include a modem 1158, is connected to a communication computing device on a WAN 1154, or includes other means setting communication through the WAN 1154 via the Internet and the like. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, electromagnetic fields or particles, optical fields or particles, or a predetermined combination thereof.

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured product" includes a computer program, a carrier, or a media accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein includes one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be arranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

What is claimed is:

1. A non-transitory computer readable medium including a computer program, the computer program causing a computer to perform operations for calibration when executed by one or more processors, the operations including:
   inputting an image into an object detection model and performing object detection using the object detection model;
   obtaining bounding box information for the detected object; and
   performing calibration on an image acquisition device based at least in part on the bounding box information,
   wherein the bounding box information includes 3D bounding box information including a rotation angle information of a coordinate system of the image acquisition device,
   wherein the rotation angle information includes at least one of azimuth of the coordinate system of the image acquisition device or elevation of the coordinate system of the image acquisition device.

2. The non-transitory computer readable medium according to claim 1, wherein the object includes a vehicle object.

3. The non-transitory computer readable medium according to claim 1, wherein the 3D bounding box information includes information of a coordinate system of the object set based on detailed component information of the object.

4. The non-transitory computer readable medium according to claim 1, wherein the object detection model includes:
   a convolutional layer to extract a feature of the image;
   a first fully connected layer for obtaining an azimuth range of a coordinate system of the image acquisition device by receiving the extracted feature; and
   a second fully connected layer for obtaining an azimuth of a coordinate system of the image acquisition device within the azimuth range.

5. The non-transitory computer readable medium according to claim 1, wherein the object detection model includes:
   a convolutional layer to extract a feature of the image;
   a third fully connected layer for obtaining an elevation angle range of a coordinate system of the image acquisition device by inputting the extracted feature; and
   a fourth fully connected layer for obtaining an elevation angle of a coordinate system of the image acquisition device within the elevation angle range.

6. The non-transitory computer readable medium according to claim 1, wherein the performing calibration on an image acquisition device based at least in part on the bounding box information includes:
   computing a distance between an image acquisition device and a reference point based on a respective bounding box information for at least one object;
   selecting a reference object that is a reference for performing calibration based on predetermined criteria; and
   performing calibration based on the reference object.

7. The non-transitory computer readable medium according to claim 6, wherein the computing a distance between an image acquisition device and a reference point based on a respective bounding box information for at least one object includes,
   computing a scale that is the ratio of the size of an object in a coordinate system of an image and the size of an object in a coordinate system of an image acquisition device.

8. The non-transitory computer readable medium according to claim 6, wherein the predetermined criteria include at least one of:
   a first criterion determined based on a statistic of a distance between the image acquisition device and a reference point computed based on respective bounding box information for at least one object; or a second criterion determined based on the difference between an actual distance between an image acquisition device and a reference point and a computed distance between an image acquisition device and a reference point.

9. The non-transitory computer readable medium according to claim 6, wherein the computing a distance between an image acquisition device and a reference point based on a respective bounding box information for at least one object includes:

converting a coordinate system of an image to a coordinate system of an image acquisition device; and computing a distance between an image acquisition device and a reference point based on the coordinate system of an image acquisition device.

10. The non-transitory computer readable medium according to claim 9, wherein the converting a coordinate system of an image to a coordinate system of an image acquisition device includes converting a coordinate system of an image to a coordinate system of an image acquisition device by using a first matrix including image acquisition device information and a second matrix including rotation angle information.

11. The non-transitory computer readable medium according to claim 10, wherein the converting a coordinate system of an image to a coordinate system of an image acquisition device by using a first matrix including image acquisition device information and a second matrix including rotation angle information includes:

computing an intermediate result value by calculating a coordinate system of an image and an inverse of the first matrix; and converting a coordinate system of an image to a coordinate system of an image acquisition device by calculating the computed intermediate result value and the inverse of the second matrix.

12. The non-transitory computer readable medium according to claim 1, wherein the performing calibration on an image acquisition device based at least in part on the bounding box information includes:

computing a center coordinate of an object based on a respective bounding box information for at least one object;

determining a reference plane which is a reference for performing calibration based on the center coordinate of at least one object; and performing calibration based on the reference plane.

13. The non-transitory computer readable medium according to claim 12, wherein the center coordinate includes at least one of:

a first coordinate component computed based on the coordinate and scale of an object in a coordinate system of an image; or a second coordinate component that includes a distance between the image acquisition device and a plane that includes the center coordinate of an object.

14. The non-transitory computer readable medium according to claim 13, wherein the determining a reference plane which is a reference for performing calibration based on the center coordinate of the at least one object includes:

computing a third matrix comprising the first coordinate component at the center coordinates of the at least one object computing a fourth matrix including the second coordinate component at the center coordinates of the at least one object; and determining the reference plane based on the third matrix and the fourth matrix.

15. A method for calibration, the method comprising:

inputting an image into an object detection model and performing object detection using the object detection model;

obtaining bounding box information for the detected object; and performing calibration on an image acquisition device based at least in part on the bounding box information, wherein the bounding box information includes 3D bounding box information including a rotation angle information of a coordinate system of the image acquisition device, wherein the rotation angle information includes at least one of azimuth of the coordinate system of the image acquisition device or elevation of the coordinate system of the image acquisition device.

16. A computing device comprising:

a processor including one or more cores; and a memory;

wherein the processor is configured to:

input an image into an object detection model and perform object detection using the object detection model;

obtain bounding box information for the detected object; and perform calibration on an image acquisition device based at least in part on the bounding box information, wherein the bounding box information includes 3D bounding box information including a rotation angle information of a coordinate system of the image acquisition device, wherein the rotation angle information includes at least one of azimuth of the coordinate system of the image acquisition device or elevation of the coordinate system of the image acquisition device.

* * * * *